United States Patent
Deceuninck

(10) Patent No.: US 6,601,919 B1
(45) Date of Patent: Aug. 5, 2003

(54) SEAT SUSPENSION ARRANGEMENTS

(75) Inventor: Stefaan Deceuninck, Menen (BE)

(73) Assignee: Youngflex Ag, Zug (CH)

( * ) Notice: Subject to any disclaimer, the term of this patent is extended or adjusted under 35 U.S.C. 154(b) by 0 days.

(21) Appl. No.: 09/806,641

(22) PCT Filed: Sep. 29, 1999

(86) PCT No.: PCT/EP99/07411
§ 371 (c)(1),
(2), (4) Date: Jul. 3, 2001

(87) PCT Pub. No.: WO00/20249
PCT Pub. Date: Apr. 13, 2000

(30) Foreign Application Priority Data

Oct. 2, 1998 (GB) .............................................. 9821584

(51) Int. Cl.$^7$ ................................................. B60N 2/66
(52) U.S. Cl. ................................................. 297/284.4
(58) Field of Search ........................... 297/284.1, 284.4

(56) References Cited

U.S. PATENT DOCUMENTS

| | | | | |
|---|---|---|---|---|
| 4,155,592 A | | 5/1979 | Tsuda et al. ................. | 297/284 |
| 4,588,172 A | * | 5/1986 | Fourrey et al. .......... | 297/284.4 |
| 5,449,219 A | * | 9/1995 | Hay et al. ................. | 297/284.4 |
| 6,152,531 A | * | 11/2000 | Deceuninck ............. | 297/284.1 |

FOREIGN PATENT DOCUMENTS

| | | |
|---|---|---|
| DE | 4038345 | 12/1990 |
| DE | 4220955 | 6/1992 |
| EP | 0552904 | 7/1993 |
| FR | 2765531 | 8/1999 |
| WO | WO 93/21800 | 11/1993 |
| WO | WO 96/02166 | 2/1996 |
| WO | WO 98/07590 | 2/1998 |

* cited by examiner

*Primary Examiner*—Peter R. Brown
(74) *Attorney, Agent, or Firm*—Wood, Herron & Evans, LLP

(57) ABSTRACT

A seat suspension arrangement comprising a seat frame (5), upholstery supporting means (1, 3) suspended transversely between lateral margins (5a) of the seat frame (5) and adjustable link means (7) for varying the transverse tension in the upholstery supporting means (1, 3) to vary the effective profile of the support provided by said upholstery supporting means (1, 3), wherein a plurality of said adjustable link means (7) are provided, spaced apart in a direction parallel to said lateral margins (5a) of the seat frame (5), and means is provided for enabling adjustment of the relative lengths of said plurality of link means (7) in such a manner that the profile of the support can be varied, both to adjust the degree of support provided at a given point, and also to adjust the position of the point at which said support is provided.

5 Claims, 2 Drawing Sheets

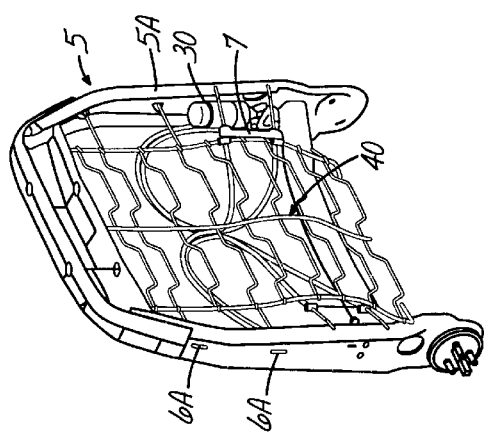
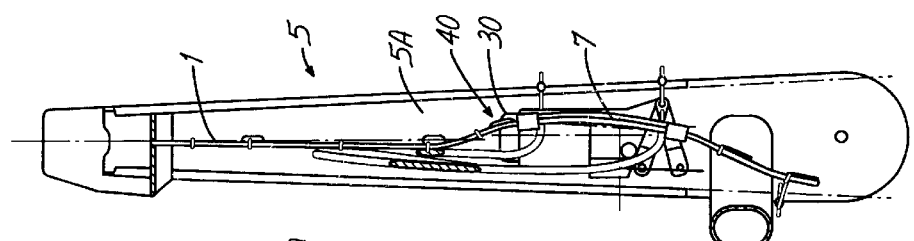
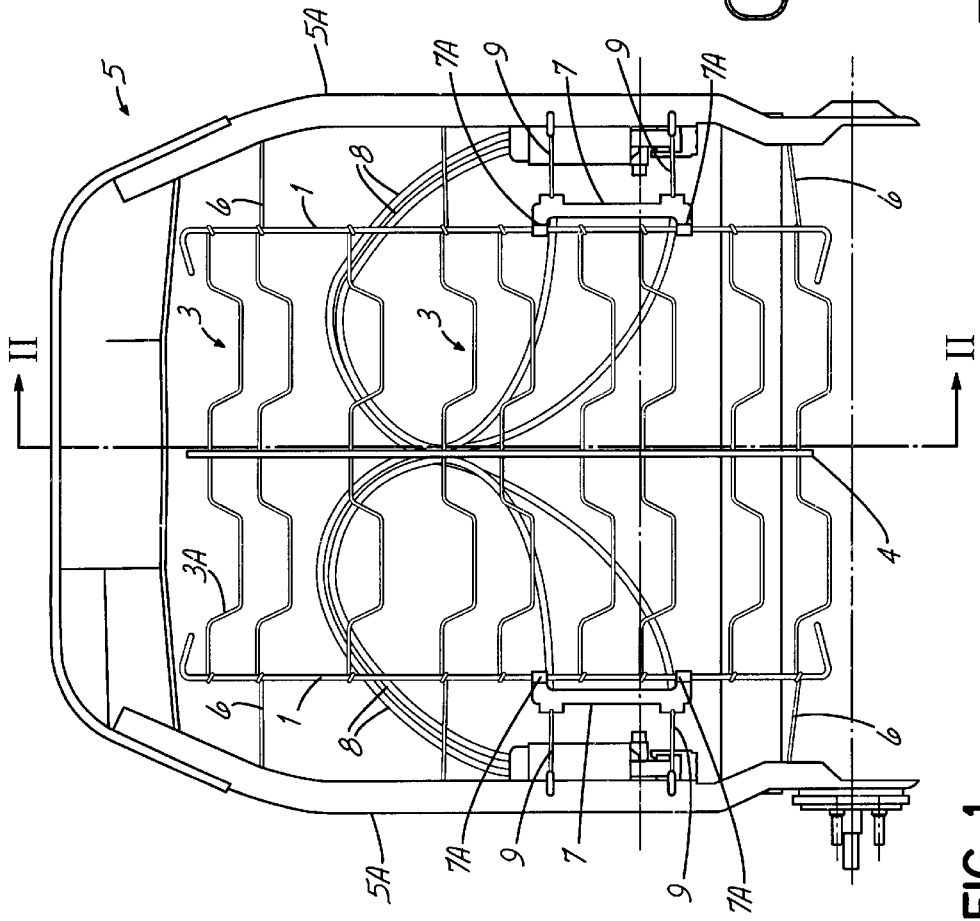
FIG. 3
FIG. 2
FIG. 1

SEAT SUSPENSION ARRANGEMENTS

This invention concerns improvements in or relating to seat suspension arrangements of the kind enabling the contour of the support provided by a seat to be adjusted by the user. The arrangement is particularly intended for use in the backrest of a vehicle seat to provide adjustable lumbar support, but it will be appreciated that the principle may be applied to any other arrangement wherein the contour of a seat cushion is desired to be adjusted, for example to a seat base having means for providing adjustable thigh support.

The present invention has particular reference to a seat suspension arrangement of the kind described and claimed in our co-pending International Patent Application No PCT/EP97/04580 (Publication No WO 98/07590) the contents of which are included herein by this reference. The invention is not limited to application in this context, however.

Arrangements of the kind referred to above are applicable to seats having upholstery supporting means suspended transversely in the seat to support the seat upholstery, and make use of tensioning elements in the form of one or more adjustable links that can serve to vary the degree of tension in the upholstery supporting means suspended in the seat frame in a given region, for example the lumbar region, to cause variation in the profile of the upholstery support. The adjustable links are advantageously provided by Bowden cables.

When such an arrangement is applied to a seat back to provide adjustable lumbar support, it gives lumbar adjustment in a horizontal direction. However there is an increasing demand for vehicle seats with so-called "four way" lumbar adjustment in which the lumbar supporting area of the seat can be moved to and fro, not only in the horizontal direction, but also vertically.

The additional vertical adjustment has been provided in some known arrangements by arranging for vertical movement of the upholstery supporting means itself as a unit in order to move the point of lumbar support. However such an arrangement is relatively complicated and expensive and would in any case be very difficult to apply to a Bowden cable actuated mechanism of the kind under consideration.

It is therefore an object of the invention to provide an improved arrangement of the kind using tensioning elements in the form of adjustable links to adjust the contour of a seat support in which more versatile adjustment of the contour of such a platform element is possible.

According to the invention there is provided a seat arrangement comprising a seat frame, upholstery supporting means suspended transversely between lateral margins of the seat frame and adjustable link means for varying the tranverse tension in the upholstery supporting means between said margins at a given point in order to vary the effective profile of the support provided by said supporting means, wherein a plurality of said adjustable link means are provided, spaced apart in a direction parallel to said margins of the seat frame, and means is provided for enabling adjustment of the relative lengths of said plurality of link means in such a manner that the profile of the support can be varied, both to adjust the degree of support provided at a given point, and also to adjust the position of the point at which said support is provided.

A preferred embodiment of the present invention comprises a seat frame and a platform element adapted to provide support for upholstery of the seat, the platform element being linked to the seat frame by adjustable link means disposed at two or more locations along at least one margin of the platform element, the said platform element being so constructed that it is resiliently extensible in a direction towards said margin of said seat frame, means being provided for adjusting the effective length of said link means, the arrangement being such that with the link means in an extended condition at at least one of the said two or more locations on the margin of the platform element at least one portion thereof is recessed relatively to a boundary of the seat frame forming an attachment for the link means, and said adjustable link means being supplemented by further non-adjustable link means for retaining the position of the margin of said platform element relatively to the seat frame whereby upon contraction of the adjustable link means said portion of the platform element is displaced towards said boundary in order to vary the contour of the said platform element.

The adjustable link means may conveniently be provided for each side margin of the platform element at at least two locations on each said side margin.

The adjustable link means for the or each margin may be provided with a separate mounting bracket at each location or may be provided with a common mounting bracket spanning the locations at each margin.

Advantageously the means for adjusting the effective length of the adjustable link means are formed of Bowden cables suitably mounted in the brackets referred to above and may be manually actuable or in the alternative may be actuated by one or more suitable power packs controllable by the seat user according to personal preference.

By way of example only one embodiment of seat suspension arrangement according to the invention is described below with reference to the accompanying drawings in which:

FIG. 1 is a front elevation of a seat suspension platform for a seat back of a vehicle, shown in place in a seat frame together with an associated adjusting arrangement, showing a lumbar region of the suspension platform in a first condition;

FIG. 2 is a sectional elevation on the line II—II in FIG. 1;

FIG. 3 is a perspective front view corresponding to FIG. 1 showing a lumbar region of the platform element in a first condition;

Figure 6:
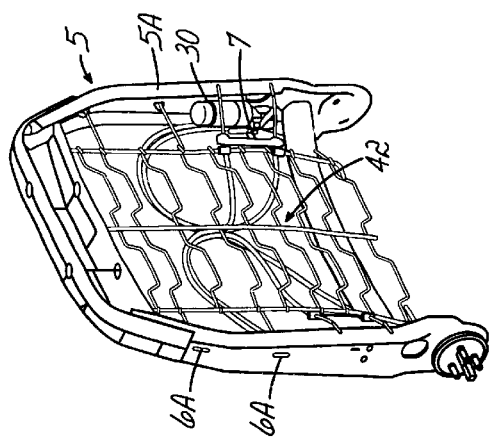
FIG. 6 is a perspective front view corresponding to FIG. 4 showing a lumbar region of the platform element in a second first condition.

Referring to the drawings, a platform element for supporting the upholstery of a vehicle seat back comprises a pair of side rails 1 formed in known manner of paper wrapped or plastic coated steel wire, the side rails being bent over at their relatively upper and lower ends as shown.

Between the side rails 1 are provided a plurality of transverse supporting wires 3 which are angled at 3A so that they form sinuous wire springs allowing for limited transverse stretching of the platform element. The wires 3 are anchored to the rails 1 by being wound around the latter in such a manner that they compress the paper or plastic covering of the side rails and are thereby retained in their longitudinal spacing. The longitudinal pitch of the wires 3 is varied in accordance with the desired support characteristics to be provided by the platform element, and the transverse supporting wires 3 penetrate and are interconnected centrally by means of a longitudinal cord 4.

A seat frame is indicated at 5 and the platform element is suspended in the seat frame at spaced apart locations by means of non-adjustable wire links 6 which in this example are extensions of selected wires 3 which are reeved around the rails 1 and are attached as at 6A at a point towards the rear boundary of the side pillars 5A of the frame 5 as can be seen more clearly in FIGS. 3 and 6. It will be appreciated that the wire links 6 in alternative embodiments may be separate from the wires 3 and may for example be of a form disclosed in the said co-pending International Application.

In the region of the platform element that is intended to provide lumbar support for the occupant of the seat, there is attached to each side rail 1 a sheet metal bracket 7 which has lugs 7A engaging the rail and also providing two spaced anchorages for the outer sheaths 8 of two Bowden cables 9. The cables 9 are coupled to one or more powered actuators 30 situated within a side pillar 5A of the seat frame 5. A control (not shown) for the actuator(s) is provided in a suitable location for ease of access by the occupant of the seat. It will be understood that in an alternative embodiment of the present invention a manual actuator such as that designated generally at 10 in our co-pending International Patent Application could be adopted.

The cables 9 extend through the bracket 7 and are connected to a front boundary of the side pillars 5A of the frame 5 and effectively act as wire links determining the positions of the adjacent portions of the side rails 1 relatively to the seat frame 5.

Thus by operation of the power actuators 30 the Bowden cables can be retracted relatively to the brackets 7, thus shortening the links coupling the side rails 1 to the frame 5 at these points.

Referring more particularly to FIGS. 1 to 3, the platform element is shown in a first condition in which the lumbar region is in a support mode with the wires 3 being contoured outwardly as at 40. The degree of outward extension of the wires 3 is governed by the tension applied by tie Bowden cables and accordingly the maximum lumbar support is provided when the tension is at a maximum level thereby tensioning the platform element forwardly as can clearly be seen from FIG. 3 at the level of the brackets 7. Since the wire links 6 are non-adjustable and limited in their extension capacity, they prevent displacement of the remainder of the platform element.

Figure 5:
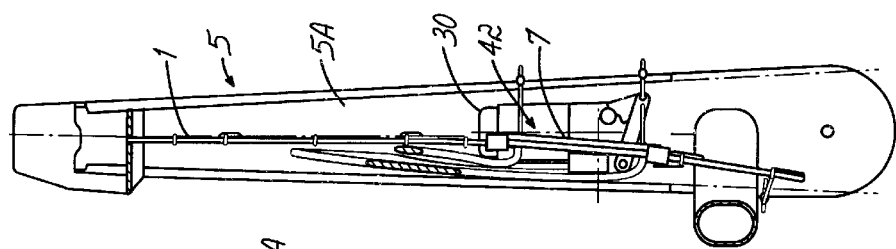
FIG. 5 is a sectional view on the line VI—VI of FIG. 4.
Figure 4:
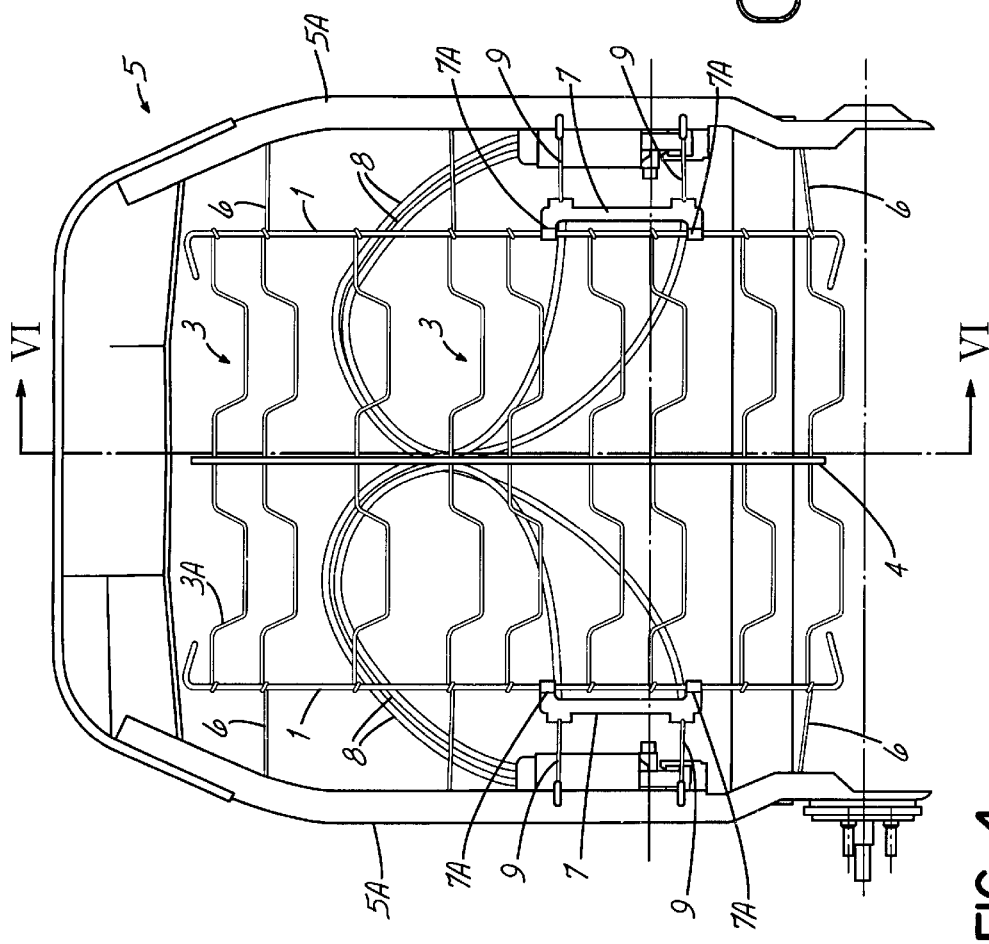
FIG. 4 is a front elevation of the seat suspension platform of FIG. 1 showing a lumbar region of the suspension platform in a second condition.

Referring now to FIGS. 4 to 6, it will readily be observed that the platform element has assumed a second condition in which the lumbar region is relatively flat as at 42. In this condition, the tension in the Bowden cables 9 has been relaxed to reduce the level of tie contour thereby reducing the degree of lumbar support.

It will be appreciated that by varying the tension in the cables either in unison or individually the contour of the lumbar region can be varied correspondingly to provide a customized profile for the individual occupant of the seat. More particularly by selecting the relative tension that is applied to each of the cables the effective point of lumbar support can be moved vertically by correspondingly profiling the platform element so that the abovementioned "four way" adjustment can be achieved without the need for vertical movement of the platform element itself.

It will be understood that whilst the invention has been described with particular reference to link means provided at two locations on each side rail, further adjustable link means may be provided on each rail according to the particular requirements. Furthermore although adjustable link means are provided on each side of the seat frame, in an economy version they may be provided on only one side of the seat. It would also be possible, instead of providing adjustable link means at the lateral margins of the platform element, to divide the platform element vertically at its centre and to arrange the adjustable link means within the boundaries of the supporting surface provided by the platform element.

What is claimed is:

1. A seat arrangement comprising:

a seat frame (5) providing a seat back;

an upholstery supporting means comprising a platform element formed by a pair of spaced apart side rails (1) between which are anchored transverse supporting elements (3) that are resiliently extensible to allow limited transverse stretching of the platform element;

the side rails (1) being linked to the seat frame (5) by substantially inextensible link means (6), and also being linked by adjustable link means (9) which are operable for tensioning said transverse supporting elements (3) via at least one of said side rails (1) to provide adjustable lumbar support in the back seat;

at least two of said adjustable link means being provided at intervals spaced apart in the longitudinal direction of the seat back, and the spaced apart adjustable link means being individually operable such that differential adjustment of said spaced apart link means varies the profile of the platform element to provide a lumbar support that is adjustable both in degree and in position along the longitudinal axis of the platform element.

2. A seat arrangement according to claim 1, wherein each of said side rails (1) is linked to one side of the seat frame (5), between adjacent longitudinally spaced inextensible link means (6), by the adjustable link means (9), the profile of each of the side rails (1) in the region between the non-extensible link means (6) being variable by relative tensioning of the two adjustable link means (9).

3. A seat arrangement according to claim 2, wherein points of attachment of said adjustable link means to said side rails (1) are recessed in a vertical plane relatively to points of attachment of said adjustable link means to the seat frame (5).

4. A seat arrangement according to claim 2 or 3, wherein the two adjustable link means (9) linked to each side rail (1) are linked by a common mounting bracket (7) spanning pins of attachment of the adjustable link means (9) to the side rails (1).

5. A seat arrangement according to anyone of claims 1–3, wherein said adjustable link means are Bowden cables.

* * * * *

UNITED STATES PATENT AND TRADEMARK OFFICE
CERTIFICATE OF CORRECTION

PATENT NO. : 6,601,919 B1  Page 1 of 1
DATED : August 5, 2003
INVENTOR(S) : Deceuninck It is certified that error appears in the above-identified patent and that said Letters Patent is hereby corrected as shown below:

<u>Title page,</u>
Item [73], Assignee, should read -- L & P Swiss Holding Company, St. Gallen (CH) --

Signed and Sealed this

Sixteenth Day of December, 2003

JAMES E. ROGAN
*Director of the United States Patent and Trademark Office*